US009600098B2

(12) United States Patent
Bohn (10) Patent No.: US 9,600,098 B2
(45) Date of Patent: Mar. 21, 2017

(54) SCROLL WHEEL ASSEMBLY FOR SCROLLING AN IMAGE IN MULTIPLE DIRECTIONS

(71) Applicant: David D. Bohn, Fort Collins, CO (US)

(72) Inventor: David D. Bohn, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/072,973

(22) Filed: Nov. 6, 2013

(65) Prior Publication Data

US 2014/0062883 A1    Mar. 6, 2014

Related U.S. Application Data

(63) Continuation of application No. 11/193,446, filed on Aug. 1, 2005, now abandoned, which is a
(Continued)

(51) Int. Cl.
*G06F 3/0354* (2013.01)
*G06F 3/0362* (2013.01)
(Continued)

(52) U.S. Cl.
CPC .......... *G06F 3/0362* (2013.01); *G06F 3/0312* (2013.01); *G06F 3/03543* (2013.01); *G06F 3/0485* (2013.01)

(58) Field of Classification Search
CPC . G06F 3/01; G06F 3/044; G06F 3/045; G06F 2203/04109; G06F 2203/04106;
(Continued)

(56) References Cited

U.S. PATENT DOCUMENTS

| 2,717,792 A | 9/1955 | Pelley |
| 4,372,435 A | 2/1983 | Bradbury |

(Continued)

FOREIGN PATENT DOCUMENTS

| EP | 1258019 A1 | 11/2002 |
| JP | 07-092939 | 4/1995 |
| JP | 2000200147 A | 7/2000 |

OTHER PUBLICATIONS

Bourns PTA Series—Low Profile slide Potentiometer, 2 sheets, date unknown, but prior to the filing of this application.
(Continued)

*Primary Examiner* — William Boddie
*Assistant Examiner* — Bryan Earles
(74) *Attorney, Agent, or Firm* — Banner & Witcoff, Ltd.

(57) ABSTRACT

A scroll wheel assembly for computer input device having a housing. The scroll wheel assembly includes a housing and an engagable scroll wheel. The scroll wheel is rotatable with a shaft to preferably cause vertical scrolling of an image on a display. The scroll wheel is laterally tiltable relative to the housing and the shaft. A sensor is preferably positioned within the housing for sensing tilting of the rotatable member. In response to sensed tilting movement of the rotatable member, the image is horizontally scrolled, preferably in the direction of the lateral movement. The computer input device having the rotatable member may take the form of a keyboard, a mouse, a trackball device, or another type of computer input device.

11 Claims, 11 Drawing Sheets

Related U.S. Application Data continuation of application No. 11/094,259, filed on Mar. 31, 2005, now abandoned, which is a continuation of application No. 10/382,652, filed on Mar. 7, 2003, now Pat. No. 7,075,516.

(51) Int. Cl.
*G06F 3/03* (2006.01)
*G06F 3/0485* (2013.01)

(58) Field of Classification Search
CPC . G06F 2203/04104; G06F 2203/04101; G06F 2203/041; G06F 2203/04105
See application file for complete search history.

(56) References Cited

U.S. PATENT DOCUMENTS

| | | |
|---|---|---|
| 4,712,101 A | 12/1987 | Culver |
| 4,720,703 A | 1/1988 | Schnarel, Jr. et al. |
| 4,922,620 A * | 5/1990 | Terragni .................. 33/366.14 |
| 5,063,289 A | 11/1991 | Jasinski et al. |
| 5,235,868 A | 8/1993 | Culver |
| 5,404,152 A | 4/1995 | Nagai |
| 5,446,481 A | 8/1995 | Gillick et al. |
| 5,477,508 A | 12/1995 | Will |
| 5,510,811 A | 4/1996 | Tobey et al. |
| 5,517,257 A | 5/1996 | Dunn et al. |
| 5,521,617 A | 5/1996 | Imai et al. |
| 5,530,455 A | 6/1996 | Gillick et al. |
| 5,602,566 A * | 2/1997 | Motosyuku ........... G06F 1/1626 345/156 |
| 5,755,008 A | 5/1998 | Rose |
| 5,771,038 A | 6/1998 | Wang |
| 5,774,075 A | 6/1998 | Palalau et al. |
| 5,808,568 A | 9/1998 | Wu |
| 5,910,789 A | 6/1999 | Vigen |
| 5,912,661 A | 6/1999 | Siddiqui |
| 5,952,997 A | 9/1999 | Hu |
| 5,956,018 A | 9/1999 | Pejic et al. |
| 5,959,614 A | 9/1999 | Ho |
| 5,963,197 A | 10/1999 | Bacon et al. |
| 6,075,518 A * | 6/2000 | Pruchniak ..................... 345/157 |
| 6,075,575 A | 6/2000 | Schein et al. |
| 6,097,371 A | 8/2000 | Siddiqui et al. |
| 6,097,372 A | 8/2000 | Suzuki |
| 6,100,874 A | 8/2000 | Schena et al. |
| D431,037 S | 9/2000 | Varga et al. |
| 6,128,006 A | 10/2000 | Rosenberg et al. |
| 6,132,118 A | 10/2000 | Grezeszak |
| 6,188,393 B1 | 2/2001 | Shu |
| 6,198,473 B1 | 3/2001 | Armstrong |
| 6,204,838 B1 | 3/2001 | Wang et al. |
| 6,281,881 B1 | 8/2001 | Siddiqui et al. |
| 6,300,939 B1 | 10/2001 | Decker et al. |
| 6,323,844 B1 | 11/2001 | Yeh et al. |
| 6,337,679 B1 | 1/2002 | Chou |
| 6,340,800 B1 | 1/2002 | Zhai et al. |
| 6,340,966 B1 | 1/2002 | Wang et al. |
| 6,348,912 B1 | 2/2002 | Smith |
| 6,353,429 B1 | 3/2002 | Long |
| 6,359,611 B2 | 3/2002 | Chan |
| 6,373,404 B1 | 4/2002 | Chou |
| 6,380,927 B1 | 4/2002 | Ostrum et al. |
| 6,424,355 B2 | 7/2002 | Watanabe et al. |
| 6,519,003 B1 | 2/2003 | Swayze |
| 6,522,321 B1 | 2/2003 | Chen et al. |
| 6,534,730 B2 | 3/2003 | Ohmoto et al. |
| 6,555,768 B2 | 4/2003 | Deruginsky et al. |
| 6,563,490 B1 | 5/2003 | Wang et al. |
| 6,570,108 B2 | 5/2003 | Lin |
| 6,580,420 B1 | 6/2003 | Wang |
| 6,608,616 B2 | 8/2003 | Lin |
| 6,697,050 B1 | 2/2004 | Shinohe et al. |
| 6,717,572 B1 | 4/2004 | Chou et al. |
| 6,809,275 B1 | 10/2004 | Cheng et al. |
| 6,809,727 B2 | 10/2004 | Piot et al. |
| 6,921,054 B2 | 7/2005 | Doan |
| 7,084,854 B1 | 8/2006 | Moore et al. |
| 7,084,856 B2 | 8/2006 | Huppi |
| 7,119,791 B2 | 10/2006 | Iwasaki |
| 7,146,005 B1 * | 12/2006 | Anft et al. ............... 379/433.06 |
| 2001/0011995 A1 | 8/2001 | Hinckley et al. |
| 2001/0050673 A1 | 12/2001 | Davenport |
| 2002/0024502 A1 | 2/2002 | Iwasaki |
| 2002/0030664 A1 | 3/2002 | Schena et al. |
| 2002/0054023 A1 | 5/2002 | Adan et al. |
| 2002/0158844 A1 | 10/2002 | McLoone et al. |
| 2002/0180701 A1 | 12/2002 | Hayama et al. |
| 2003/0025673 A1 | 2/2003 | Ledbetter et al. |
| 2003/0076303 A1 | 4/2003 | Huppi |
| 2003/0095096 A1 | 5/2003 | Robbin et al. |
| 2003/0107547 A1 | 6/2003 | Kehlstadt et al. |
| 2003/0151594 A1 | 8/2003 | Tsai |
| 2003/0160159 A1 * | 8/2003 | Chung ..................... 250/231.13 |
| 2004/0001042 A1 | 1/2004 | Lindhout et al. |
| 2004/0051392 A1 | 3/2004 | Badarneh |
| 2004/0150623 A1 | 8/2004 | Ledbetter et al. |

OTHER PUBLICATIONS

Web page reviewing "Kensington TurboRing Trackball"; <http://www.avault.com/hardware/print_review.asp?review=turboring>; publication date unknown, but believed to be prior to Jun. 28, 2002.
Web page reviewing "TurboRing"; <http://www.macworld.com/2000/10/reviews/turboring.html>; publication date unknown, but believed to be prior to Jun. 28, 2002.
Web page from "Van's Hardware", <http://www.vanshardware.com/reviews/2001/october/011002_TurboRing/011002_TurboRing.htm>; published Oct. 2, 2001.
Web page for "Yahoo 8D Internet Mouse"; <http://www.panwebi.com/products/computer/mouse/8dintermetmouse.htm>; publication date unknown, but believed to be prior to Jun. 2, 2002.
"Photo A"; photograph of scroll wheel from LOGITECH cordless optical mouse, P/N 851497-0000; date of first availability and/or disclosure prior to (or believed to be prior to) Jun. 3, 2002.
"Photo B"; (second) photograph of scroll wheel from LOGITECH cordless optical mouse, P/N 851497-0000; date of first availability and/or disclosure prior to (or believed to be prior to) Jun. 3, 2002.
"Photo C"; photograph of scroll wheel from mouse manufactured by A4tech Co., Ltd., Taipei, Taiwan; date of first availability and/or disclosure prior to (or believed to be prior to) Jun. 3, 2002.
"Photo D"; (second) photograph of scroll wheel from mouse manufactured by A4tech Co., Ltd., Taipei, Taiwan; date of first availability and/or disclosure prior to (or believed to be prior to) Jun. 3, 2002.
"Photo E"; photograph of scroll wheel from mouse manufactured by KYE Systems, Taipei, Taiwan; date of first availability and/or disclosure prior to (or believed to be prior to) Jun. 3, 2002.
"Photo F"; photograph of scroll wheel from RAZER "Boomstang" mouse, available from Kama LLC, Taiwan, date of first availability and/or disclosure prior to (or believed to be prior to) Jun. 3, 2002.
<http://www.mside.net/microscrollii.html>, MSIDE.net, showing Micro Scroll II Mouse from Micro, 2 sheets, Dec. 2000.
<http://www.contourdesign.com/rollerball.htm>, Contour Design-RollerBar Mousing Station-Optical Technology, 2 sheets, Jan. 2001 and 1 sheet press release dated Nov. 29, 2000.
<http://www.mousetrapper.dk>, Mouse Trapper product description, 12 color sheets including original Danish language and English translation as performed by Translation Experts Ltd. Service, date of product release unknown bu prior to filing date of applicaiton.
U.S. Appl. No. 10/158,996, filed Jun. 3, 2002.
U.S. Appl. No. 10/183,993, filed Jun. 28, 2002.

\* cited by examiner

SCROLL WHEEL ASSEMBLY FOR SCROLLING AN IMAGE IN MULTIPLE DIRECTIONS

This application is a continuation of and claims priority to U.S. Ser. No. 11/193,446, filed Aug. 1, 2005, which is a continuation application and claims priority to U.S. Ser. No. 11/094,259, filed Mar. 31, 2005 which is a Continuation application and claims priority to U.S. Ser. No. 10/382,652, filed Mar. 7, 2003, all of which are incorporated herein in their entirety.

FIELD OF THE INVENTION

The present invention relates to an input device including an assembly for scrolling an image in multiple directions relative to a display screen. More particularly, the present invention relates to a peripheral input device, such as a mouse or a keyboard, that may be operatively connected to a host computer and includes a scroll wheel assembly that can move an image in multiple axes relative to a display screen.

BACKGROUND OF THE INVENTION

Scroll wheels have been provided on computer mice and used by computer operators to move an image relative to a display screen of a host computer. A scroll wheel assembly includes a rotatable scroll wheel and a sensor that are typically included in a housing for a peripheral computer device such as a mouse. Typically, a portion of the scroll wheel protrudes upwardly out of an opening in its housing and is rotated in order to vertically scroll the image along the screen. An example of a mouse including a known scroll wheel assembly is described in U.S. Pat. No. 5,912,661, entitled "Z-ENCODER MECHANISM" which is hereby fully incorporated by reference.

Scrolling, as used herein, describes the movement of an image relative to a display screen in a particular direction as such term is commonly used in the art. For example, the term "scroll down" as used herein relates to moving the viewable contents of a file (such as a text document or image) relative to display screen by an amount to produce an effect of moving down in the document or image. Similarly, the terms scroll up, scroll left and scroll right relate to moving the viewable contents of a file relative to a screen by an amount to produce an effect of moving in the document or image up, left, and right, respectively. The term scrolling as used herein also includes panning, which is the automatic scrolling of an image.

In operation, a conventional scroll wheel is normally rotated about a first, transversely extending axis secured within a housing in order to scroll the image up and down (vertically) relative to the display screen. As the scroll wheel is rotated, an encoder senses the rotation of an encoder wheel and delivers a corresponding signal to a host computer which in turn can be used to move an image as is known in the art and disclosed in U.S. Pat. No. 5,912,661. This can occur without the user moving the position of the mouse and/or the cursor. However, many types of documents, such as spreadsheets and graphics files, are usually wider than the width of the display screen and the user may want to scroll horizontally across the screen to see the entire file. When the user needs to move the image horizontally across the display screen, the user must typically stop what he or she is doing and perform a number of tedious and potentially frustrating steps. These include locating a graphical user interface in the form of a horizontal scroll bar usually located near the bottom of the display, positioning the cursor on the scroll bar, and then rotating the wheel. Locating the scroll bar can be very difficult for people with bad eyesight, small display screens and/or poor hand-eye coordination. As a result, the user will waste time and delay the completion of his project while fumbling to find the bottom horizontal scroll bar. These delays can cause the user great frustration and unnecessary stress that is magnified when he or she is operating under a deadline. Alternative graphically assisted tools for horizontal scrolling requiring cursor repositioning have similar drawbacks.

If the user does not accurately position the cursor over the horizontal scroll bar, the image will not scroll horizontally with respect to the display screen as he or she operates the mouse cursor of the graphical interface or rotates the mouse wheel. Instead, when using the mouse cursor on the graphical interface, nothing happens until he or she tries again to position the mouse cursor correctly on the scroll bar's points of operation. Or, when using the mouse wheel, the image will move vertically relative to the display screen and erroneously change the displayed image. These errors will force the user to take additional steps to reposition the desired image on the display screen. These steps include the user confirming that the cursor is not positioned on the horizontal scroll bar and rotating the scroll wheel in the opposite direction to return the image to its previous position. Unfortunately, repositioning an image can lead to errors if the image is being amended. For example, the user may not return the image to its previous position. As a result, he may amend the wrong section of the image. Even if the proper image or portion of an image is returned to the display screen, the user must still attempt to locate the bottom, horizontal scroll bar a second time in order to finally move the image in a horizontal direction.

Microside Corporation of Miami, Fla., offers a "Micro Scroll II" mouse that permits a user to scroll an image in multiple perpendicular directions. This mouse includes a first rotatable wheel for scrolling an image up and down, and a second, separate rotatable wheel for scrolling an image left and right. The rotatable wheels are oriented so they extend and rotate in planes that are perpendicular to each other. The two scroll wheels are independently operable. However, this arrangement has drawbacks as the two wheels takes up valuable upper surface area on the mouse which could be used for supporting the hand of the user or for additional input keys. Further, the two wheels have been made to be a small size to accommodate both wheels on the upper surface of the mouse. The smaller sized scroll wheels make the scrolling more difficult to control. Additionally, the location of the horizontal scroll wheel is inconvenient for effective control. Further, with this design, it is difficult to easily reach and manipulate one of the wheels, as he or she must reposition his or her hand on the mouse to avoid reaching without awkwardly finger manipulation Accordingly, an alternative arrangement for scrolling a document along multiple axes was needed.

BRIEF SUMMARY OF THE INVENTION

One aspect of the present invention relates to a peripheral device for use with a computer to scroll an image relative to an image display screen along perpendicular axes. The device comprises a housing that has at least one opening. The device also comprises a scroll wheel assembly that is provided within the housing. The scroll wheel assembly includes a rotatable member positioned within the opening of the housing. The rotatable member is rotatable about an axis that extends within the housing and is laterally pivotable within the opening relative to the housing. The scroll wheel assembly also includes a movement sensing system that determines when the rotatable member is pivoted laterally relative to the housing. A ball joint is used to facilitate movement of the scroll wheel in the different directions.

Another aspect of the present invention includes a peripheral computer input device for scrolling an image across a display screen in perpendicular directions. The device includes a housing and a scroll wheel assembly. The scroll wheel assembly includes a rotatable member that is laterally pivotable relative to the housing and a sensor positioned within the housing for sensing laterally pivotal movement of the rotatable member. The device also includes a controller coupled to the sensor. The controller is configured to generate a signal to scroll the image across the display screen.

Another aspect of the present invention includes a computer input device having a scroll wheel and a rotational shaft forming an axis of rotation for the scroll wheel. The scroll wheel is coupled to the shaft to enable a rotational force applied to the scroll wheel rotate the shaft with the scroll wheel and to enable a lateral force applied to the scroll wheel to pivot the scroll wheel relative to the shaft.

The device according to the present invention makes it easy for a user to scroll an image both horizontally and vertically relative to a display screen without repositioning the peripheral device. Additionally, the wheel movements and/or configuration of the scroll wheel assembly of the present invention to cause scrolling in the perpendicular directions eliminate problems and frustrations that may result from using the prior art devices.

Another aspect of the present invention includes a computer input device having a scroll wheel that is endlessly rotatable about a laterally extending axis and is laterally pivotable. Systems are included for (a) sensing the rotation of the scroll wheel, (b) sensing the angular displacement of the scroll wheel, and (c) biasing the scroll wheel towards a neutral position.

BRIEF DESCRIPTION OF THE DRAWINGS

The present invention will be described in detail herein with reference to the attached drawings, in which.

DETAILED DESCRIPTION OF THE INVENTION

Figure 1:
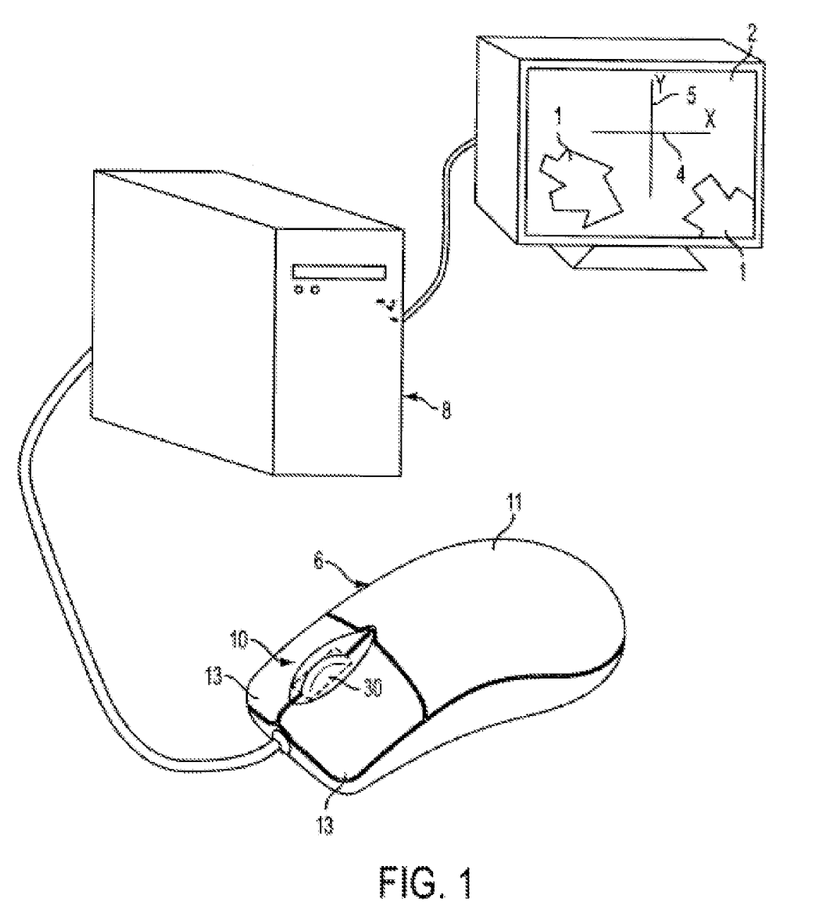
FIG. 1 illustrates an input device according to the present invention for scrolling an image on a display screen of a host computer in multiple directions.

As shown in the figures, an exemplary embodiment of the present invention includes a scroll wheel assembly 10 having a rotatable member 30 (scroll wheel) that can be used with different types of computer input devices for scrolling an image 1 in multiple directions and along multiple axes (X, Y) (4 and 5 respectively) relative to a display screen 2 used with a host computer 8 another type of computing device, or an Internet appliance. As shown in FIG. 1, one embodiment of the scroll wheel assembly 10 according to the present invention can be incorporated as part of an electronic mouse 6. However, according to other embodiments of the present invention, not shown, the scroll wheel assembly 10 is incorporated into other peripheral computer input devices such as a trackball device or a keyboard, or a similar input device. For example, it could also be located in the bezel of a hand-held computer, a larger portable computing device, a web pad, or an Internet appliance, or could be located on the chassis of a laptop computer Like the mouse 6, these other known peripheral devices can have wired or wireless connections to the host computer 8 as is known in the art. The scroll wheel assembly 10 can alternatively be located in a computer monitor or in the base portion of a laptop computer. For simplicity in description, the present invention will be described as embodied in a computer mouse 6, and the mouse 6 includes actuator buttons 13. However, it should be understood that the discussion of the scroll wheel assembly 10 is equally applicable for use in other types of computer input devices.

As used herein, the terms "laterally pivoted" and "laterally pivotable" describe motion of the rotatable member that includes the general side-to-side pivotable movement of a rotatable member within an opening of an input device in a direction that tilts the primary plane in which the rotatable member resides and rotates. This laterally pivotable movement is generally in the direction of the sidewalls of the opening.

As shown in FIG. 1, one embodiment of the scroll wheel assembly 10 comprises a rotatable member, such as a circular disk-shaped scroll wheel 30 positioned within an elongated opening 15 in a housing 11 of the mouse 6. A portion of the wheel 30 protrudes through the opening 15 and away from the outer surface of the mouse 6 so that it can be contacted and manipulated by a user. As described in more detail hereinafter, in addition to its normal rotational movement for vertical scrolling, the rotatable member 30 is laterally pivotable to horizontally scroll an image on the display screen 2. The outer surface of the rotatable member 30 of the scroll wheel assembly 10 may include a slip resistant material (such as a rubber coating) and/or a slip resistant arrangement (such a grooves or a knurled surface) that are contacted by the user's finger in order to enhance scrolling control.

Figure 2:
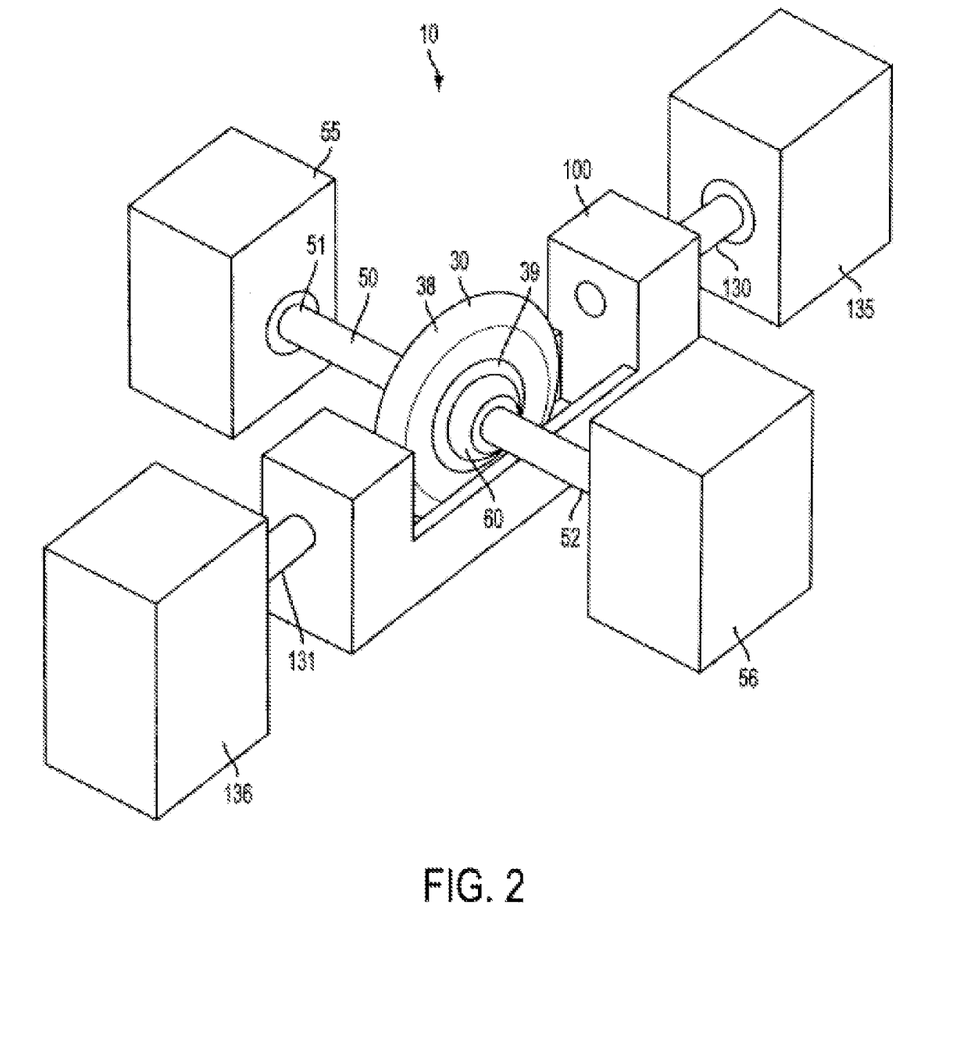
FIG. 2 is a perspective view of a scroll wheel assembly according to one embodiment of the present invention with the plane of the scroll wheel in a first position.
Figure 3:
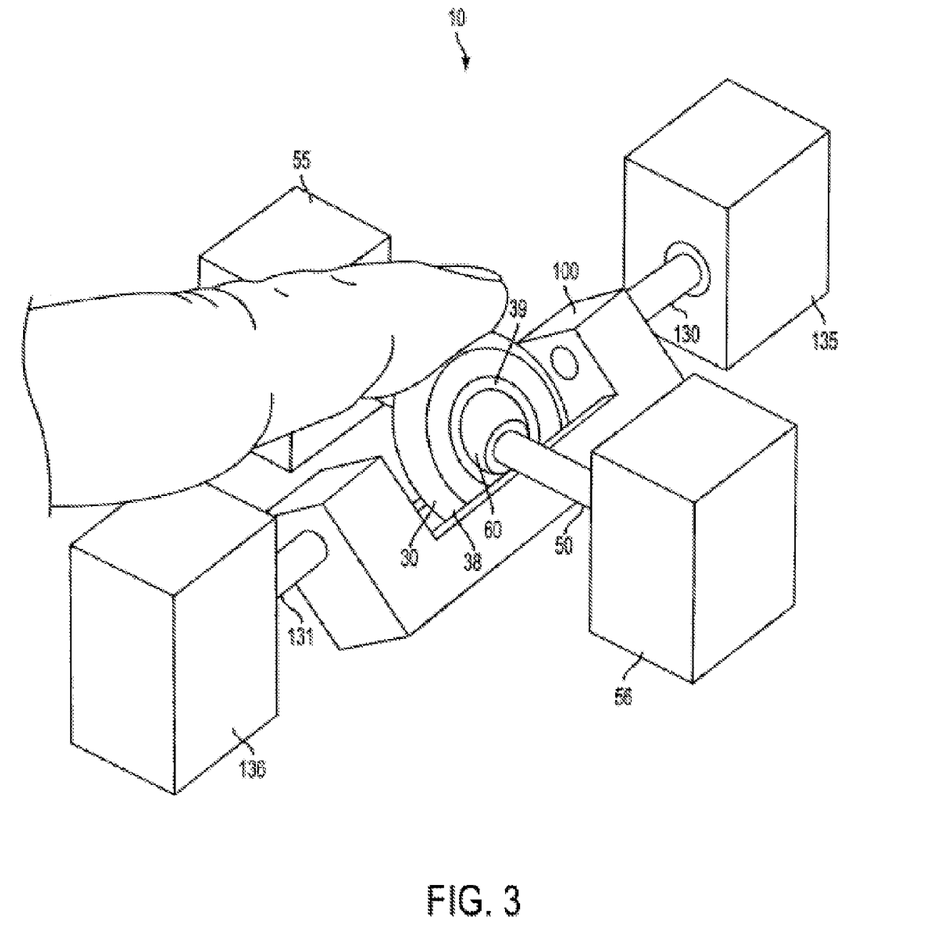
FIG. 3 is a perspective view of the scroll wheel assembly of FIG. 2 after the scroll wheel has been displaced in laterally pivotal direction relative to FIG. 2.
Figure 4:
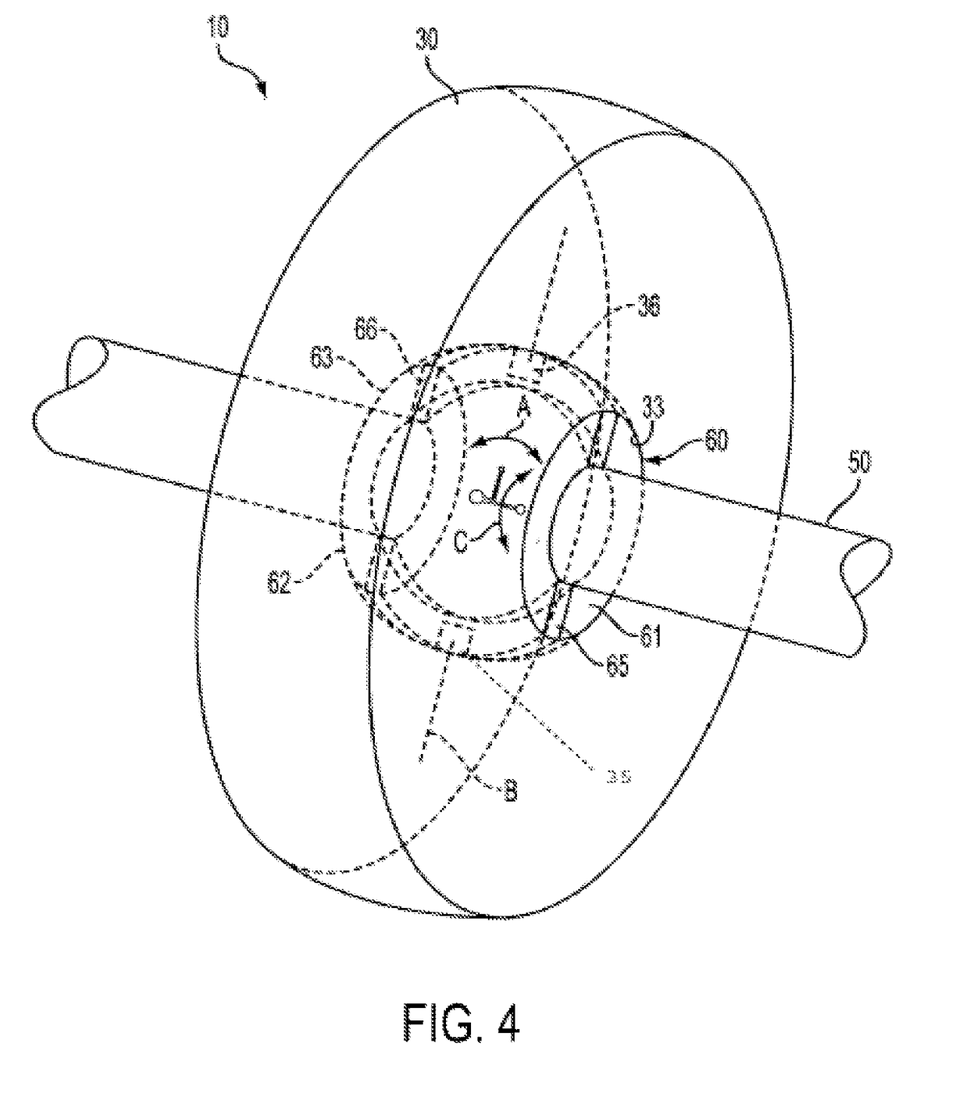
FIG. 4 is an isometric view of details of the arrangement for coupling the scroll wheel to its shaft according to one embodiment of the present invention.

With reference to FIGS. 2-4, an exemplary scroll wheel assembly 10 includes the scroll wheel 30, a rotatable shaft 50, and a convex hub/ball joint 60. The rotatable shaft 50 may be coupled to the mouse 6 in any desired manner that achieves the described functionality of providing support and endless rotation capabilities. For example, the opposing ends 51 and 52 of rotatable shaft 50 may be mounted within support blocks 55 and 56 having cylindrical bearing surfaces. Alternatively, one end of the shaft 50 may be rotatably received within a support and the other end may be slidably received within a support such that it too permits rotational movement of the shaft 50. Similarly, the supports could also be positioned along the length of shaft 50 so that they are spaced from its ends.

Due to the coupling by the ball joint 60, a rotational force applied to the scroll wheel 10 will cause the shaft 50 to rotate with the scroll wheel 10 and with respect to the housing 11, and a laterally pivotable force applied to the scroll wheel 10 will cause the scroll wheel 10 to laterally pivot relative to the shaft 50 and the housing 11. While not shown in FIGS. 2-4, the scroll wheel assembly 10 also includes a rotation sensing system 70, a tilt sensing system 80 and a tilt biasing system 100. As described hereinafter, the tilt sensing system 80 and the tilt biasing system 100 may share common components.

The ball joint 60 is fixed to the shaft 50 such that the ball joint 60 rotates with the shaft 50. The ball joint 60 and shaft 50 may, but need not be, integrally formed therewith by molding or other technique. If desired, the lateral ends 61 and 62 of the ball joint 60 may be truncated as shown in the FIGS. 2-4. The ball joint 60 includes a convex outer surface 63. The ball joint 60 also includes two lateral slots or grooves 65 and 66 therein. In an exemplary arrangement depicted in FIG. 4, the grooves 65 and 66 extend from one lateral end 65 to the other lateral end 66. The grooves 65 and 66 are spaced apart 180° about the rotational axis of the scroll wheel 30, which is coincident with the shaft 50. In an alternative embodiment of the invention, not shown, only one pin and one groove are included.

The scroll wheel 30 includes an inner concave surface 33 that faces and is supported by the convex outer surface 63 of the ball joint 60. The scroll wheel 30 also includes first and second pins 35 and 36 projecting inwardly from the inner surface 33. The pins 35 and 36 are spaced apart 180° about the rotational axis of the scroll wheel 30 so as to align with the grooves 65 and 66 respectively.

The pins 35 and 36 are circular in cross section. The circular pins 35 and 36 in combinations with the grooves 65 and 66 enable the scroll wheel 30 to laterally pivot with respect to the shaft 50 and the ball joint 60 regardless of the angular position of the shaft 50. For example, if the ball joint 60 is oriented relative to the aperture such that a laterally pivotable force on the scroll wheel 30 is substantially within the plane of pins 35 and 36 and the grooves 65 and 66, then the pins 35 and 36 would travel within the grooves 65 and 66 when the scroll wheel 30 laterally pivots in the direction shown by arrow A. If the ball joint 60 is oriented relative to the aperture such that a laterally pivotable force on the scroll wheel 30 is perpendicular to the axis extending through the pins 35 and 36 and parallel to the plane of the grooves 65 and 66, then the pins 35 and 36 pivot about axis B within in the grooves 65 and 66, and would not translationally move when the scroll wheel 30 laterally pivots. If the ball joint 60 is oriented relative to the aperture between those positions, each of the pins 35 and 36 would pivot and translate within their respective groove 65 and 66. When the scroll wheel 30 is rotated in the direction shown by arrow C, the pins 35 and 36 press against the sides of the grooves 65 and 66 so that the ball joint 60 and shaft 50 rotate with the scroll wheel 30.

In an exemplary embodiment the scroll wheel 30 is made from two different materials, an outer region 38 made from rubber material to enhance gripping and control during the scrolling process, and an inner region 39 made from a plastic. This can be manufactured by an overmolding process if desired. The outer surface 63 region of the ball joint 60 is also made from a plastic. In an exemplary arrangement, the plastics of the inner region 39 of the scroll wheel 30 and the outer surface 63 region of the ball joint 60 are made from different types of plastic, such as ABS and Nylon, for wear-related purposes. However, it is recognized that other materials may be used in addition to those described.

As described above, all embodiments preferably include a rotation sensing system 70, a tilting sensing system 80, and a tilt biasing system 90. For simplicity of explanation, some embodiments of these systems have been depicted separately.

Figure 5:
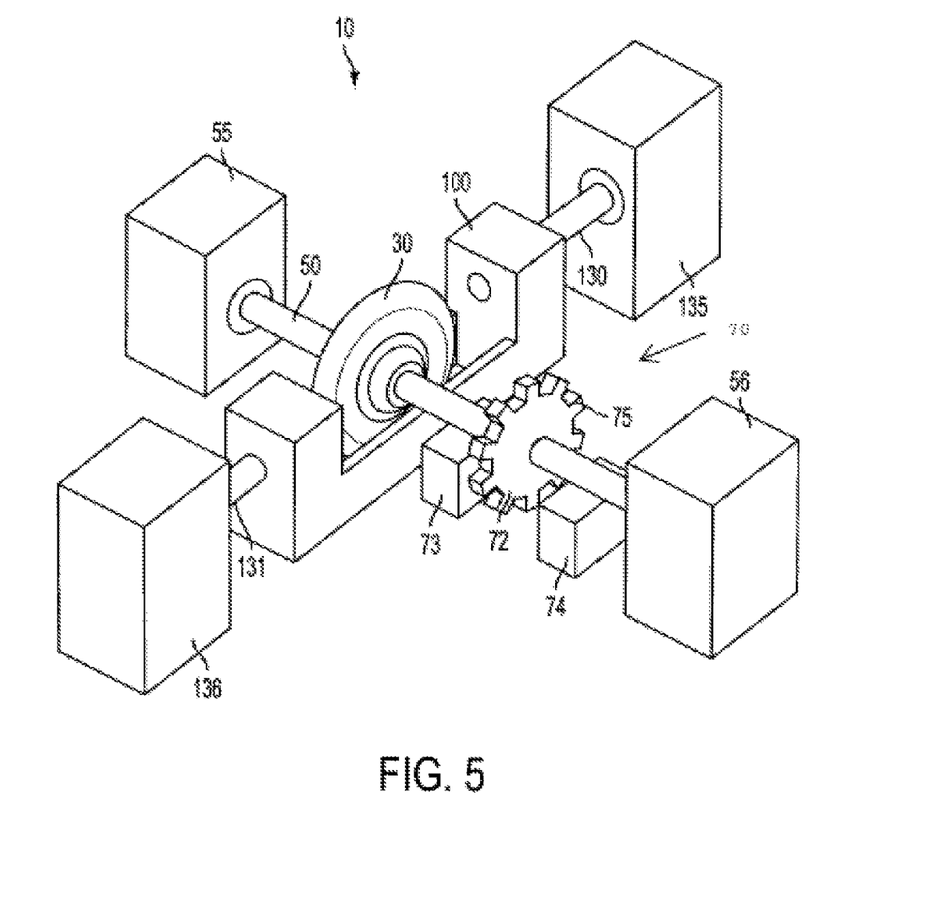
FIG. 5 is a schematic perspective view of details of the arrangement for sensing rotational movement of the scroll wheel according to one embodiment of the present invention.

FIG. 5 depicts an embodiment of a rotation sensing system 70. In an exemplary arrangement, the rotation sensing system 70, which senses the rotation of the endlessly rotatable scroll wheel 30, includes a disk encoder 72 and separate elements 73 and 74 from an optical pair. The encoder 72 is fixedly mounted to the scroll wheel shaft 50. The outer periphery of the encoder wheel includes spaced light blocking elements, such as angularly spaced, radially extending blades 75. The two elements 73 and 74 of the optical pair on opposing sides of the encoder 72. Of the optical pair elements, one is a light source 73 and the other is a light sensor 74. The rotation of the scroll wheel 30 rotates the shaft 50 and the encoder 72 mounted thereto. The spaced light blocking elements 75 periodically block the path of light and pulses are picked up each time a blade blocks the light path. As the encoder wheel rotates, light from the light source is alternately (1) transmitted through the openings and (2) blocked by the material of the encoder wheel. The pulses of light transmitted through the openings are detected by the light sensor. In response to the pulses of light, the light sensor transmits a signal to a host computer that indicates rotation of the scroll wheel, thereby inducing scrolling of the image relative to the display screen. Furthermore, the frequency of the sensed pulses corresponds to the rate at which the scroll wheel is being rotated. Accordingly, the rate at which the scroll wheel rotates is generally correlated to the speed at which the image scrolls. This technology is known in the art, and has been disclosed in U.S. Pat. No. 5,912,661, which is hereby incorporated by reference. Alternative rotation sensing systems may be used.

FIGS. 6-10 depict embodiments of the tilting sensing system 80 and/or the tilt biasing system 90. The tilting sensing system 70 includes at least one sensor that determines when the wheel 30 is being tilting which would typically occur by a lateral force being applies to the portion of the scroll wheel 30 extending through the opening 15 in the housing 11. The scroll wheel assembly 10 also includes a circuitry, such as a controller, not shown, for interpreting the output from the sensor, converting it to a signal and delivering the signal to the host computer 8. The controller can be any known component or combination of components that can perform these functions. In one embodiment, the controller includes a microprocessor connected to the sensor that generates a signal for the host computer 8 indicating when the scroll wheel 30 is being laterally moved. Thus, each sensor is operatively connected to the microprocessor for generating an electrical signal that controls the position of the image 1 relative to the display screen 2 as discussed above. The generated signal controls the scrolling of the image 1 along the X-axis 4 in response to a force that causes the wheel 30 to move laterally. The signal scrolls the image 1 in a manner that is consistent with the direction and magnitude of the applied force, i.e., either left or right.

In the depicted exemplary embodiments, the systems utilize a carriage 100 that receives the lower portion of the scroll wheel 30 on the side of the scroll wheel 30 that is opposite from the aperture 15 in the mouse housing 11. The carriage 100 includes opposing side walls 102 on opposite sides of the bottom of the scroll wheel 30. The side walls 102 of the carriage 100 and the sides of the scroll wheel are preferably separated by a small gap 104, such as 0.1 mm. When the scroll wheel 30 is tilted, it will move a small amount and then engage the side wall 102 on the side of the carriage 100 that the scroll wheel 30 has been tilted. This small gap 104 enables sufficient tilting responsiveness without causing a drag on the scroll wheel 30 when it is rotated in its endless direction with its shaft 50. The carriage 100 will move, either pivot or linearly slide, in accordance with the movement of the scroll wheel 30. The movement of the carriage is sensed, and an appropriate signal is sent to cause lateral scrolling of the document.

Figure 6:
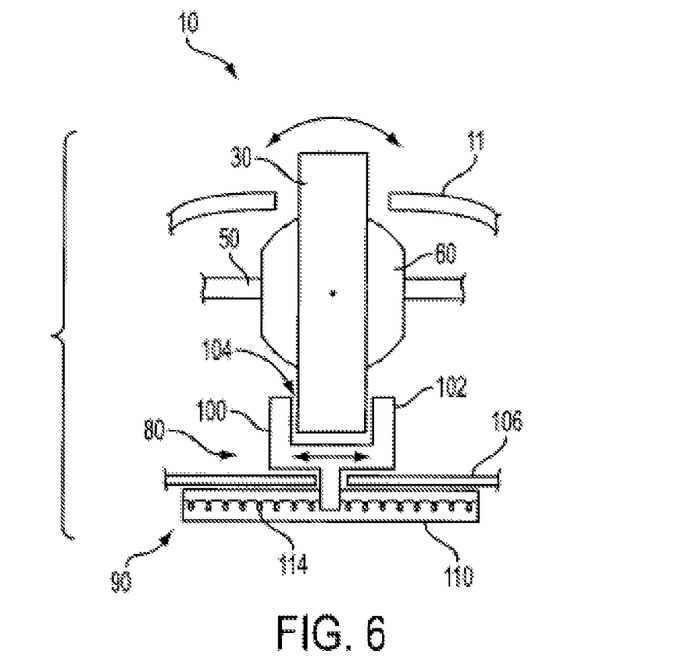
FIG. 6 is a schematic end view of details of the arrangement for sensing laterally pivotable movement of the scroll wheel according to one embodiment of the present invention.
Figure 7:
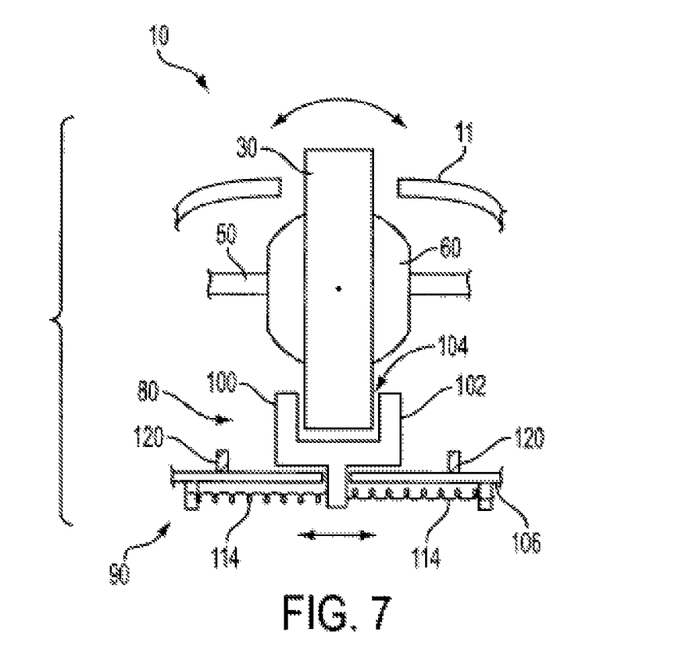
FIG. 7 is a schematic end view of details of the arrangement for sensing laterally pivotable movement of the scroll wheel according to an alternate embodiment of the present invention.

FIGS. 6 and 7 show embodiments of a sliding carriage 100. The sliding carriage 100 is mounted for movement along a lateral axis as indicated by the straight arrow in the figures. In response to the scroll wheel 30 being pivoted at its portion that extends outside of the housing 11, the side of the wheel 30 that the force was applied, pushes the inside wall 102 of the carriage near the bottom of the wheel 30 in a lateral direction opposite the lateral direction of the force applied, but in the same rotational direction relative to the pivot of the wheel. Thus for example, with reference to FIG. 6, a force applied to tilt the wheel 30 to the left, applies a counterclockwise force such that the bottom of the wheel 30 pushes the sliding carriage 100 to the right by applying a counterclockwise force.

Movement of the sliding carriage 100 is detected by a sensor. Regarding FIG. 6, the carriage 100 coupled to a slide potentiometer 110, which is in turn, mounted to a circuit board 106. The slide potentiometer 110 senses amount of displacement and provides an electrical resistance value accordingly. One such potentiometer 110 is the Low Profile Slide Potentiometer made by Bourns. However, numerous other linear slide potentiometers could be used.

For the sliding carriage arrangement of FIG. 7, discrete contact sensors 120 such as contact switches are provided on opposing sides of the wheel 30 and the carriage 100. Contact switches 120 sense when scroll wheel 30 has been tilted to a predetermined position indicating that the wheel 30 had been tilted. In other arrangements of the invention, not depicted, the sensors for detecting the tilting motion of the wheel 30 via the sliding motion of the carriage 100 include strain gauges, force plates, and pressure sensors to determine the lateral displacement of the carriage 100.

Figure 8:
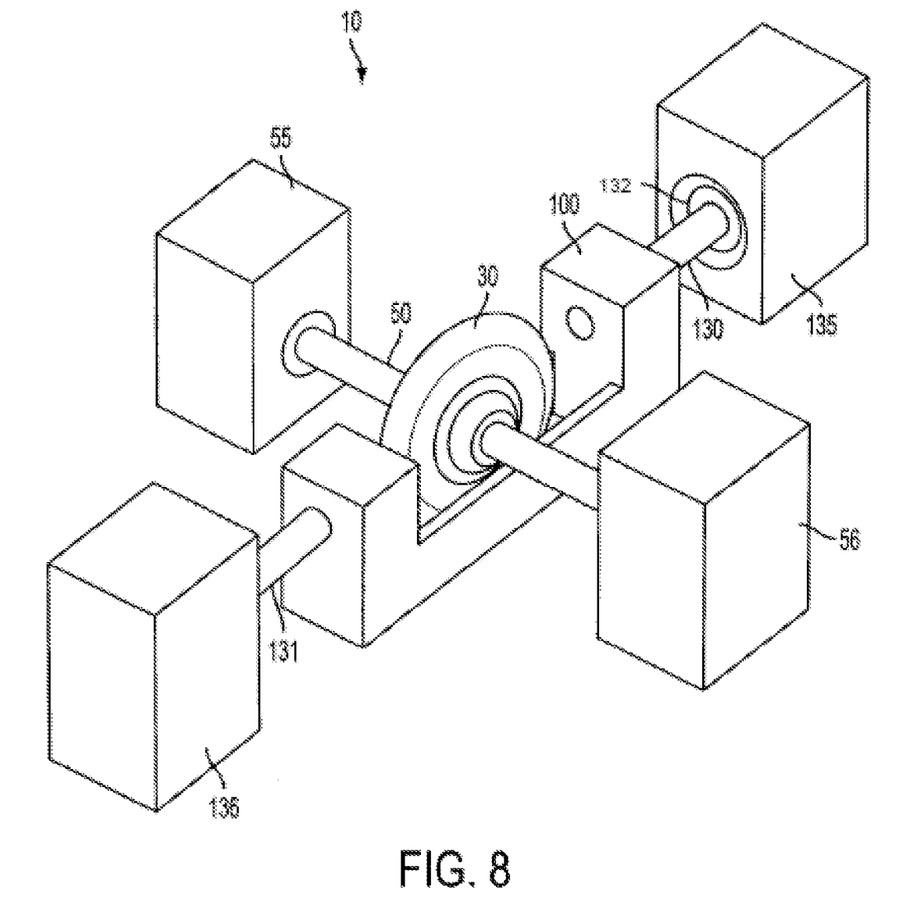
FIG. 8 is a schematic perspective view of details of the arrangement for sensing laterally pivotable movement of the scroll wheel according to an alternative embodiment of the present invention.
Figure 9:
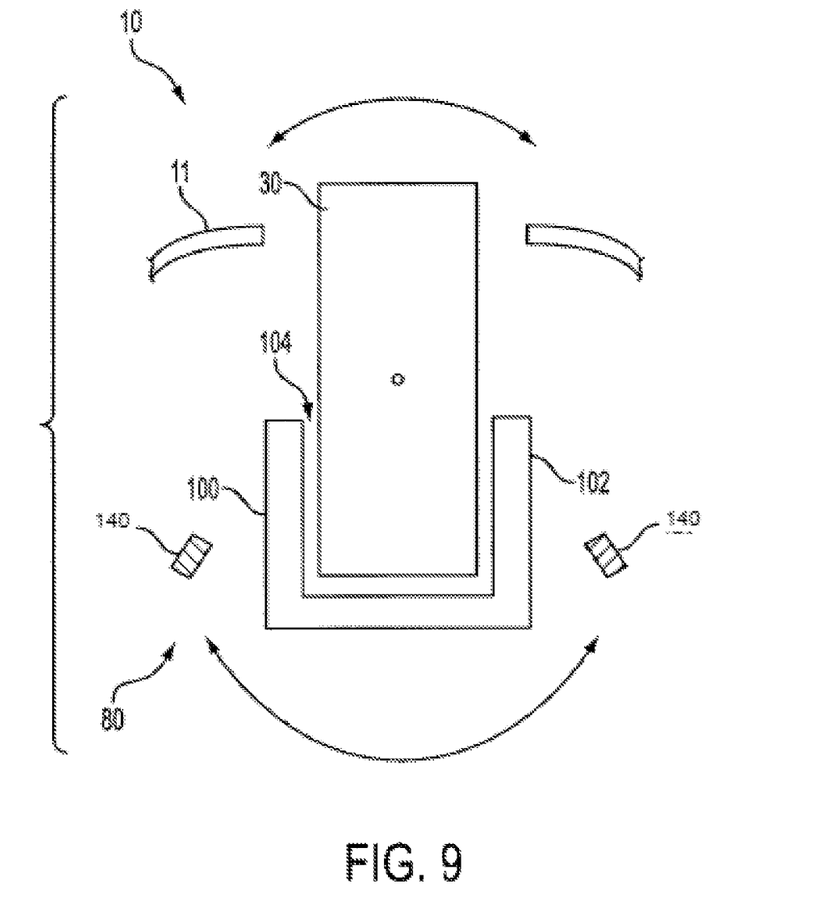
FIG. 9 is a schematic end view of details of the arrangement for sensing laterally pivotable movement of the scroll wheel according to an alternative embodiment of the present invention.
Figure 10:
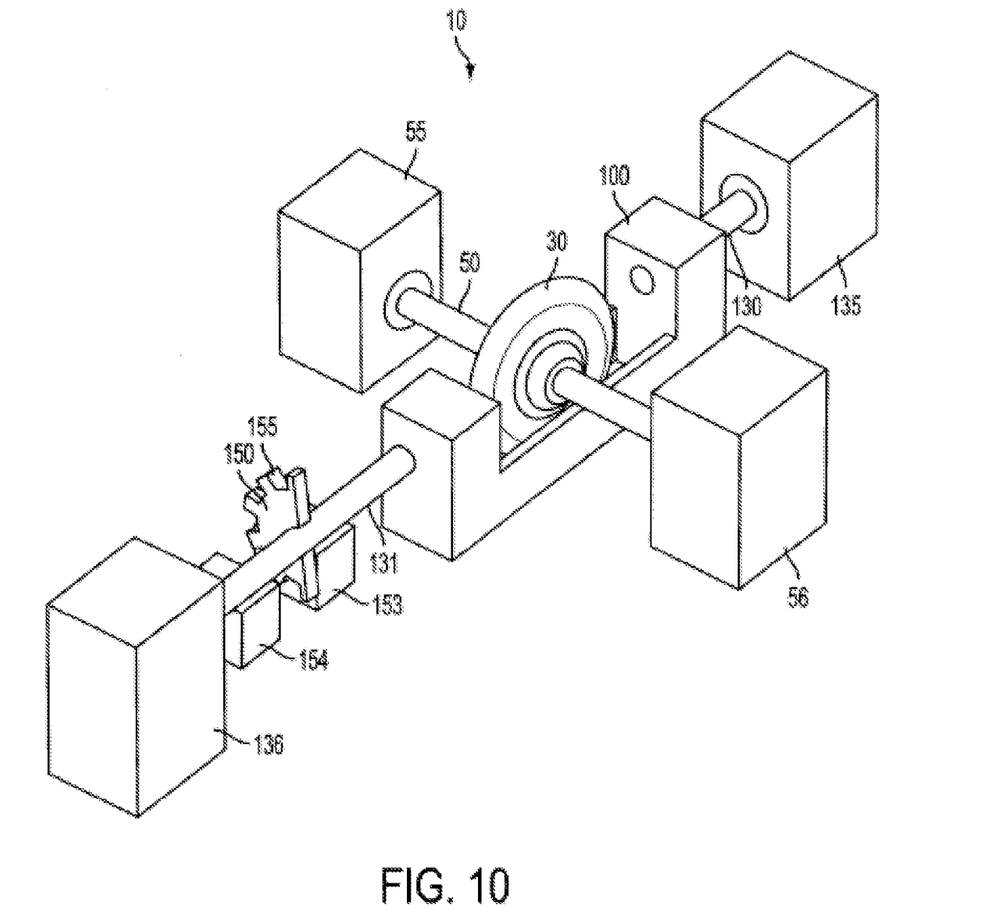
FIG. 10 is a schematic perspective view of details of the arrangement for sensing laterally pivotable movement of the scroll wheel according to another embodiment of the present invention.

FIGS. 8-10 show embodiments of a tilting carriage 100. The tilting carriage 100 is mounted for limited pivotal movement and such may be accomplished by coupling the carriage 100 to one (for cantilever mounting) or front and back rotatable shafts 130 and 131. Each shaft 130 and 131 is mounted for rotational movement within a respective support such as block 135 and 136. In response to the scroll wheel 30 being pivoted at its portion that extends outside of the housing 11, the side of the wheel 30 that the force was applied, pushes the inside wall 102 of the carriage near the bottom of the wheel 30 in the same rotational direction relative to the pivot of the wheel 30. As the carriage is pivotally mounted via its shafts 130 and 131 the carriage is rotated in the same rotational direction. The tilting carriage 100 and the scroll wheel 30 preferably rotate about the same axis.

Regarding FIG. 8, the tilting carriage 100 is coupled to a rotation sensing potentiometer 140. The potentiometer 140 senses amount of angular displacement of the carriage shaft and provides an electrical resistance value accordingly. In an exemplary embodiment, the rotational potentiometer 140 is within the support 135.

FIG. 9 shows another exemplary embodiment where the tilting of the scroll wheel 30 to a particular degree (in either direction) will engage a discrete contact sensor 140 such as contact switches provided on opposing sides of the wheel 30 and the carriage 100. For the pivoting carriage arrangement of FIG. 9, contact switches 140 are provided on opposing sides of the wheel 30. Contact switches 140 sense when scroll wheel 30 has been tilted to a predetermined angular position indicating that the wheel 30 had been tilted.

In other arrangements of the invention, not depicted, the sensors for detecting the tilting motion of the wheel 30 via the pivotable motion of the carriage 100 include strain gauges, force plates, and pressure sensors to determine the pivoting displacement of the carriage 100.

FIG. 10 shows another embodiment of a sensing system for the tilting carriage 100, including a rotary encoder 150 and an optical coupling pair 153 and 154. Of the optical pair elements, one is a light source 153 and the other is a light sensor 154. The 150 encoder need not be a full disk and/or the blades thereon 155 need not extend 360° because the wheel 30 only preferably tilts to a range of 45° degrees in either direction. As with the functioning of the encoder described above, the pivoting of the carriage 100 rotates the shaft 130, 131 and the encoder 150 mounted thereto. The spaced light blocking elements 155 periodically block the path of light and pulses are picked up each time a blade blocks the light path.

A system 90 for physically biasing the carriage 100, and accordingly also the wheel 30 to a position in a neutral zone, i.e., a central neutral position, within the spacing of the gaps 104, is also preferably used. With a carriage 100 mounted for linear slidable movement, such as shown in FIGS. 6 and 7, the biasing system 90 preferably includes one or more linear springs 114. The linear springs 114 apply a force on the carriage 100 to urge it toward a neutral position. The spring or springs 114 can be part of or separate from the sensors used such as the potentiometer 110 or a strain gauge. Alternatively, other spring biasing systems, such as leaf springs, could be used.

With a carriage 100 mounted for pivotal movement, such as shown in FIGS. 8-10, the biasing system 90 preferably includes one or more rotational/torsion springs, not numbered. The rotational springs apply a rotational force on the carriage 100 to urge it toward a neutral position. The spring or springs, not numbered, are preferably mounted within on of the shaft support blocks 135 or 136, and can be part of or separate from the rotational potentiometer 110.

Figure 11:
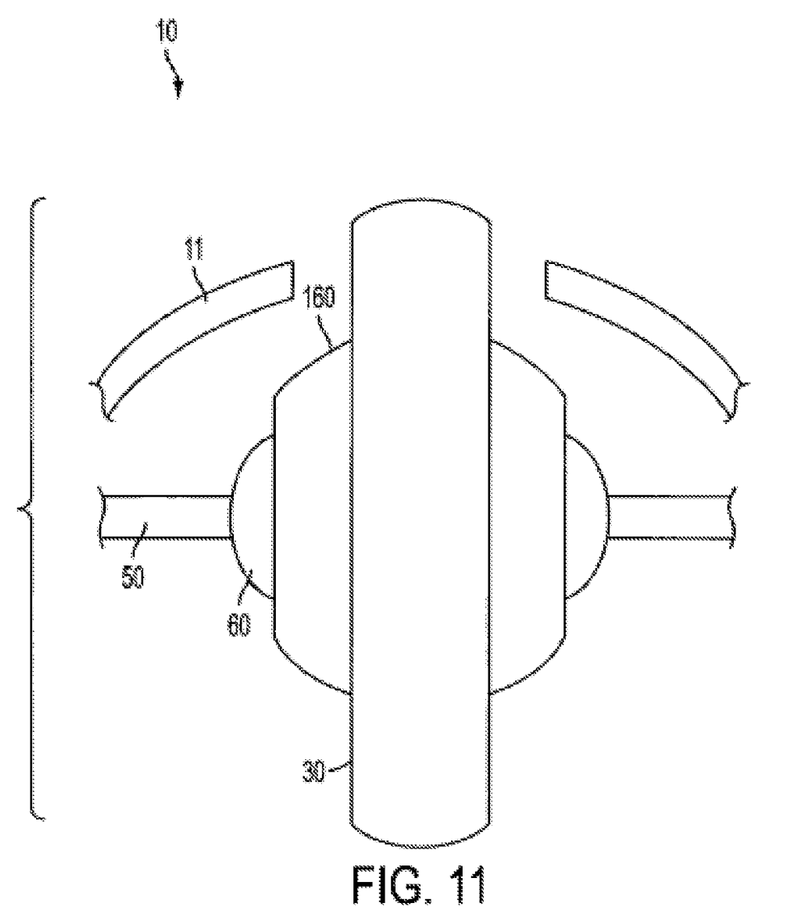
FIG. 11 is a schematic end view of a scroll wheel assembly including details of the scroll wheel relative to the opening in the housing.

FIG. 11 shows an enlarged view of the relationship of the scroll wheel 30 to the top of the housing 11 of the mouse 6 and its opening 15. The lateral spacing of the opening 15 provides the desired angular clearance to give the scroll wheel 30 the desired range of motion to laterally pivot. Additionally, the scroll wheel 30 may have a portion 160 extend in a contoured manner inside the housing to more closely match the contour of the housing and to minimize the gap between the opening 15 and the wheel 30 during the full range of motion of the wheel 30. Alternatively, a shutter type device may be used to minimize the gap between the opening 15 and the scroll wheel 30

Figure 12:
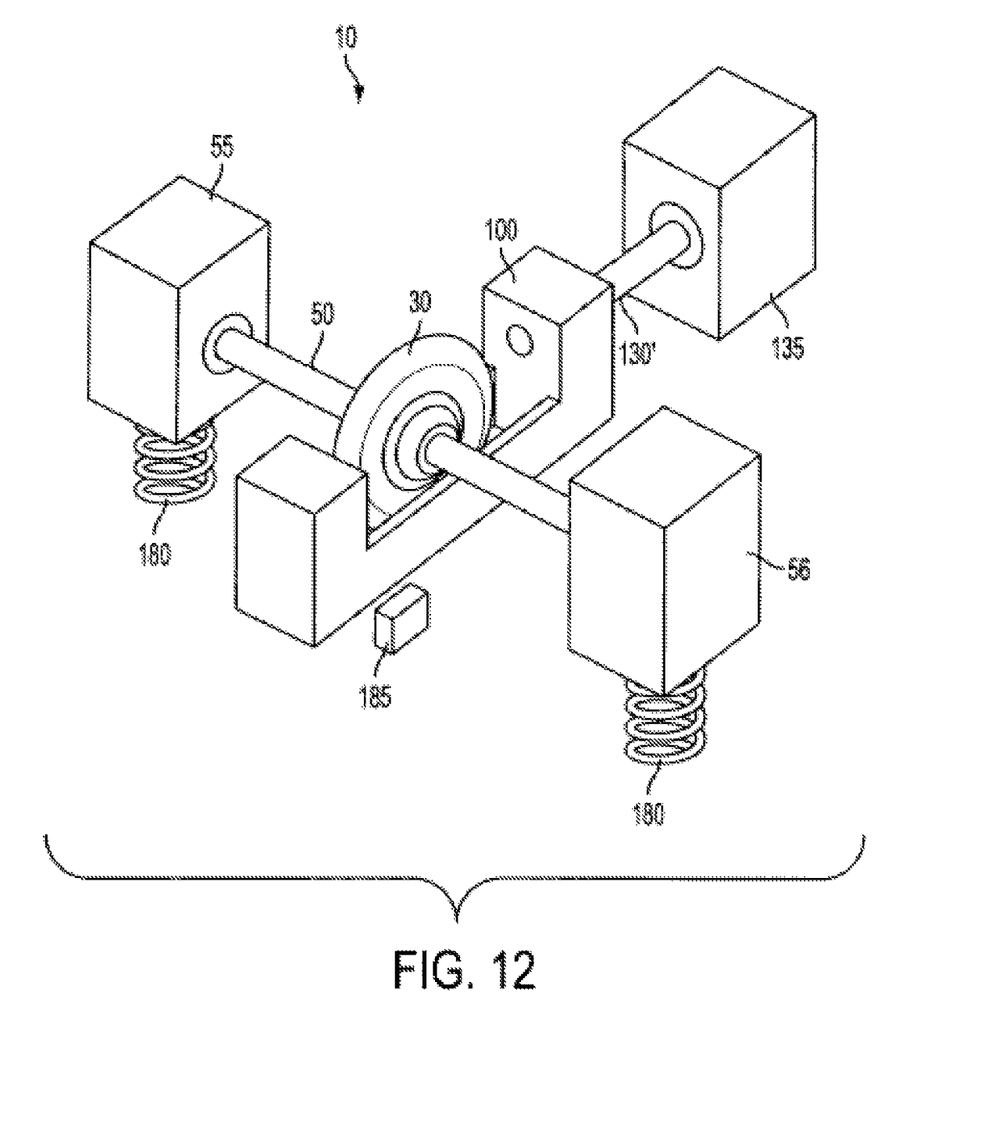
FIG. 12 is a schematic perspective view of a scroll wheel assembly including details of an arrangement with Z-switch capabilities according to an embodiment of the present invention.

FIG. 12 illustrated another exemplary embodiment of the scroll wheel assembly 10. In this arrangement, the scroll wheel 30 also provides the function of being a Z-switch actuator such that the depression of the scroll wheel 30 activates a switch 185. Springs 180 may be mounted under supports 55 and 56 to permit the system to slightly "float". Different arrangements may be used to provide the downward movement of wheel 30. In one arrangement, the front support 135 includes multiple portions pivotably coupled about a laterally oriented hinge. Alternatively, as shown, the front shaft 130' may be designed to permit a small degree of downward flexing. A contact switch 185 may be mounted beneath a desirable portion of the assembly 10 such as the carriage 100. In operation, pressing downward on the scroll wheel 30 causes the carriage 100 to contact switch 185 and activate a signal.

In operation, when the user wants to scroll the image 1 on the display screen 2 in multiple directions along multiple axes 4, 5, he or she will both rotate and/or laterally pivot the scroll wheel 30 relative to the mouse 6 to produce vertical and/or lateral scrolling, respectively. When the wheel 30 is rotated by the user, its shaft 50 moves with it, and the rotational motion is sensed by a rotational movement sensing system 70, and the image 1 is scrolled in either a positive or a negative vertical direction that extends parallel to the Y-axis 5, i.e., either up or down. Any known sensing system may be used. As illustrated and described, this rotational movement sensing system 70 can include a light source 73, an encoder wheel 72, and a light detector 74. Blades 75 on the encoder wheel periodically obstruct the light beam when the wheel 30 is rotated. The detector senses these obstructions and is coupled to a controller 11 to generate and relay a signal to the host computer 8 to scroll the image in the Y-direction up or down.

Laterally pivoting the scroll wheel 30 causes the wheel 30 to move relative to the shaft 50 due to the coupling of the ball joint 60. A carriage 100 is disposed relative to the scroll wheel 30 such that laterally pivoting of the scroll wheel 30 causes the carriage 100 to move, either linearly slide or pivot. A tilt sensing system 80 detects such movement and causes a signal to be sent to affect horizontal scrolling. A tilt biasing system 90 urges the scroll wheel 30 towards a neutral position.

The horizontal scrolling may be affected in a number of ways in response to a sensor detecting the lateral pivotable movement of the wheel 30. In a first embodiment, the image 1 will scroll across the screen 2 at a constant, predetermined speed, i.e., panning. The scrolling speed may be programmed, set, or changed by a user via any known technique. Alternatively, the horizontal scrolling may be time sensitive to the tilting of the wheel 30. For example, the scrolling may be at a first speed when the wheel 30 is laterally displaced for a first period of time. If the wheel 30 is laterally displaced longer than that first period of time, the scrolling speed may be increased. In another arrangement, lateral scrolling can be detected and controlled when lateral movement reaches a specified pressure or distance, as determined by pressure or displacement sensors. With the use of sensors in this arrangement, the sensed pressure or displacement can also be used to determine the rate of horizontal scrolling. The pressure related sensing could be accomplished by the use of pressure sensors with continuous sensing capabilities and by sensing the continuous pressure level, or by the use of pressure sensors with discrete sensing and the determination of one or more levels of pressure.

While the scroll wheel assembly 10 is preferably used to cause scrolling in the horizontal direction, it may also be used to provide single commands other than "scroll right" and "scroll left". For example, like with some keys on mice and keyboards, these commands may be programmable. Thus, moving the rotatable member of the scroll wheel assembly 10 to the left can activate a pre-programmed command such as "BACK", and moving the rotatable member to the right can activate a pre-programmed command such as "FORWARD."

Further, with the use of such a wheel, and modifier keys that create the ability to modify the input from the wheel, it is possible to control document zooming or other non-scrolling actions if desired. For example, the combined actions of the Alt and Y keystrokes and manipulation of a scroll wheel controls zooming in and out. If desired, the combination of modifier keys in combination with sliding the scroll wheel horizontally could be used to angularly rotate an image on the display, such as a drawing object. In such an example, the horizontal displacement of the wheel can affect the amount of angular rotation and/or the speed of the rotation.

It is understood that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below. For example, even though the above discussed embodiments use the rotation of the wheel 30 to vertically scroll and the translation and/or laterally pivoting of the wheel 30 to horizontally scroll, it is possible that these functions be reversed so that rotation of the wheel 30 about shaft 50 results in horizontal. Additionally, the directions that the image is scrolled according to the present invention can include both X and Y components. Additionally, the scroll wheel 10 according to the present invention is not limited to a specific type of peripheral device. Further, while not illustrated or specifically described, a detent system may be provided to make the rotation of the wheel 30 occur at desired increments.

Thus, while there have been shown and described features of the present invention as applied to preferred embodiments thereof, it will be understood that various omissions and substitutions and changes in the form and details of the devices illustrated, and in their operation, and in the method illustrated and described, may be made by those skilled in the art without departing from the spirit of the invention as broadly disclosed herein.

What is claimed is:

1. A computer input device for scrolling an image, the device comprising:

a housing having an opening;

a finger-engagable control member provided within the housing and having a portion extending through the opening permitting user manipulation thereof, the finger-engagable control member being endlessly rotatable about a rotating axis extending within the housing and tiltable about a tilting axis;

a carriage receiving at least a portion of the finger-engagable control member;

a rotation sensor for sensing rotation of the finger-engagable control member;

an optical tilt sensor for sensing tilting of the finger-engagable control member;

a tilt axle operatively connected to the carriage along the tilting axis, wherein the optical tilt sensor is located at the rear of the finger-engagable control member underlying the tilting axis and includes a light source, a light sensor, and a movable intervening member between the light source and the light sensor, the movable intervening member being operatively connected to the tilt axle; and a carriage receiving a lower portion of the finger-engagable control member, the carriage further including:

opposing side walls on opposite sides of the lower portion of the finger-engagable control member; and a gap arranged between the opposing side walls of the carriage and the sides of the lower portion of the finger-engagable control member, wherein tilting the finger-engagable control member causes the finger-engagable control member to move before engaging a side wall of the carriage, and wherein further tilting of the finger-engagable control member engages a side wall of the carriage and causes the carriage to tilt in accordance with the tilting of the finger-engagable control member, and wherein when the finger-engagable control member is rotated, a signal is transmitted to scroll the image relative to a display screen on which the image is displayed in a first scroll direction and wherein when the finger-engagable control member is tilted, a signal is transmitted to scroll the image relative to the display screen on which the image is displayed in a second scroll direction, the second scroll direction being approximately perpendicular to the first scroll direction.

2. The computer input device of claim 1, further comprising a tilt axle, wherein the optical tilt sensor includes an encoder mounted to the tilt axle and the optical tilt sensor is positioned at a rear of the finger-engagable control member.

3. The computer input device of claim 1 wherein the optical tilt sensor comprises a light source, a light sensor and a movable intervening member between the light source and the light sensor.

4. The computer input device of claim 3 wherein when the finger-engagable member is tilted in a first rotational direction, the movable intervening member moves in the same rotational direction.

5. The system of claim 1 wherein the carriage may be rotated irrespective of tilting.

6. A system comprising:

an input device for scrolling an image, the input device including:

a housing; and a finger-engagable control member provided within the housing and having a portion extending through the opening permitting user manipulation thereof, the finger-engagable control member being endlessly rotatable about a rotating axis extending within the housing and tiltable about a tilting axis;

a carriage receiving at least a portion of the finger-engagable control member;

a rotation sensor for sensing rotation of the finger-engagable control member;

an optical tilt sensor for sensing tilting of the finger-engagable control member;

a tilt axle operatively connected to the carriage along the tilting axis, wherein the optical tilt sensor is located at a rear of the finger-engagable control member underlying the tilting axis and includes a light source, a light sensor, and a movable intervening member between the light source and the light sensor, the movable intervening member being operatively connected to the tilt axle; and a carriage receiving a lower portion of the finger-engagable control member, the carriage further including:

opposing side walls on opposite sides of the lower portion of the finger-engagable control member; and a gap arranged between the opposing side walls of the carriage and the sides of the lower portion of the finger-engagable control member, wherein tilting the finger-engagable control member causes the finger-engagable control member to move before engaging a side wall of the carriage, and wherein further tilting of the finger-engagable control member engages a side wall of the carriage and causes the carriage to tilt in accordance with the tilting of the finger-engagable control member; and a controller in communication with the input device configured to generate a signal to scroll an image relative to a display screen on which the image is displayed in a first direction responsive the rotation sensor sensing rotation of the finger-engagable control member and to generate a signal to scroll the image relative to the display screen on which the image is displayed in a second direction responsive to the optical tilt sensor sensing tilting of the finger-engagable control member, the second direction being perpendicular to the first direction.

7. The system of claim 6, wherein the tilting axis is perpendicular to the rotating axis, the rotation sensor senses rotation of the finger-engagable control member about the rotating axis and the optical tilt sensor senses tilting of the finger-engagable control member about the tilting axis.

8. The system of claim 6 further comprising a tilt axle, wherein the optical tilt sensor includes an encoder mounted to the tilt axle and wherein the optical tilt sensor is positioned at a rear of the finger-engagable control member.

9. The system of claim 6 wherein the optical tilt sensor comprises a light source, a light sensor and a movable intervening member between the light source and the light sensor.

10. The system of claim 6 wherein the carriage may be rotated irrespective of tilting.

11. The system of claim 6, wherein the first direction is a vertical direction along the display screen and the second direction is a horizontal direction along the display screen.

* * * * *